FIP7906 XR X 7,701
SPECIFICATION AVAILABLE
241/235
146/121
B. R. Greene.
Straw Cutter.
X 83/346
Patented Aug. 8, 1833.
✓ 7,701 X
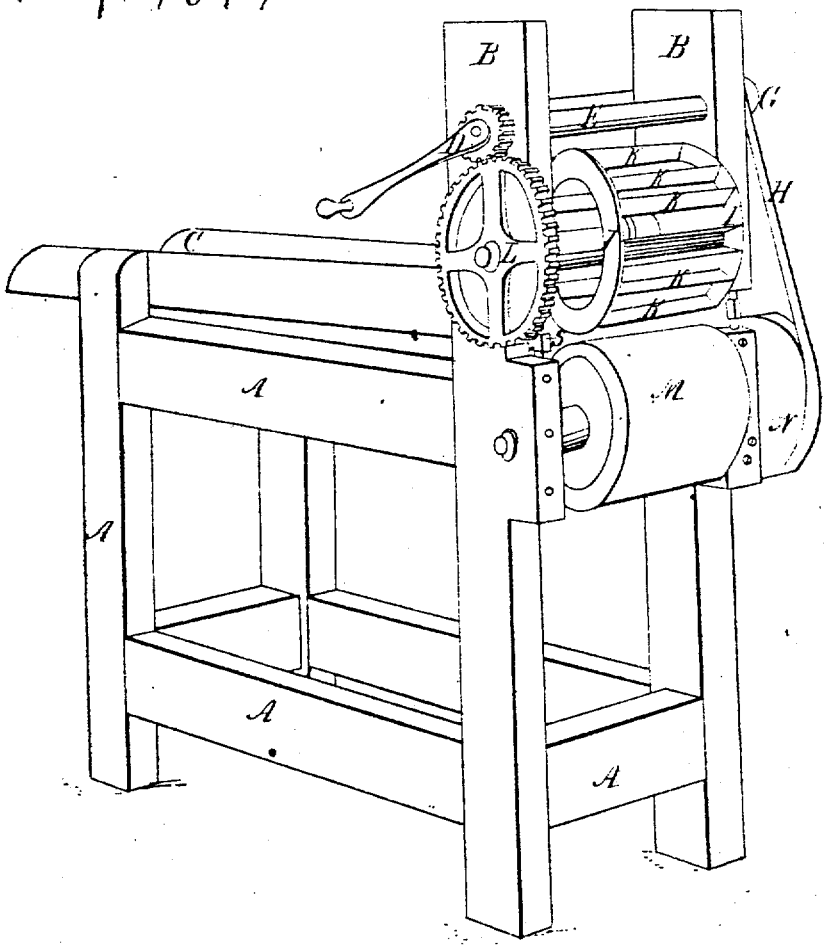
83/346
N. PETERS, PHOTO-LITHOGRAPHER, WASHINGTON, D. C.

7701X

Aug 8, 1833

Benjamin R. Greene of Warwick R. Island.
Letters Patent

The schedule referred to in these Letters Patent & making part of the same containing a description in the words of the said Benjamin R. Greene himself of his improvement in the machine for cutting straw &c.

---

Be it known that I Benjamin R. Greene of Warwick in the County of Kent, & State of Rhode Island & Providence plantations have invented a new & useful machine for cutting or chopping straw hay or other articles for horses & other cattle, & that the following is a full & exact description of the construction & operation of said machine reference being had to the drawing thereof hereto annexed.

AAAA. represent the frame of the machine which can be varied at the pleasure of the maker or owner. BB are two upright posts in said frame, upon which are secured the boxes of the axles or gudgeons, of the cylinders hereafter described — Between these posts the trough is secured, which conveys the substance to be cut or chopped to the knives. C. is the trough. D. the crank on the outer side of one of the posts B. by which motion is communicated to the machine.

E. the pinion or axle of the crank, extends thro both said posts BB — on the outer side of one of said posts, next the crank, is a small cog-wheel F. fastened to said axle, or pinion & turning with it. on the other end of said axle or pinion, & on the outer side of the other post, is a small blank wheel G. made fast to said axle or pinion, & also turning with it over which passes a band H. giving motion, to another blank wheel N. on the pinion or axle of the leader cylinder, hereafter described, giving motion to said cylinder. The object & use of these wheels & band, is to give to said leader cylinder a motion, either faster or slower, than the motion of the cylinder hereafter described, on which the knives are fastened, in order that said knives may not continue to come in contact with said leader cylinder, at the same points of its circumference, as the machine is operated.

II. represent the rims or edges, of a cast iron wheel or cylinder, in which are inserted, the knives KKKKK, in number proportioned to the circumference of said wheel or cylinder, & to the fineness with which it is desirable, to cut the straw hay or other substance — The edges of these knives project, say one eighth of an inch, beyond said 1148. 7701X wheels or cylinder, varying in width to insure sufficient strength, according to the size
of the machine, They extend lengthwise of said cylinder, or from wheel to wheel, & are
held firm at each end, by clasp bolts, or otherwise.

The sides of the knives, are in right lines from the circumference of said wheels or cy-
linder, to the center of the axle of said wheels or cylinder. Their edges are ground with
a bevel towards the side, where they first meet the substance to be cut.

These wheels or cylinder, moves between said posts BB. the axle, passing thro boxes
attached to them - outside the post next the crank on said axle, is a cog wheel I.
playing into and receiving its motion from the small cog wheel E attached to the axle
of the crank, as before described - M represents another cylinder, covered with lead, the
axle of which, passes thro the slide boxes c.c. attached to the posts BB. — .

The surface of this cylinder, in the operation of the machine must be kept against
the edges of the knives, in the other cylinder. It is drawn & held in its proper position
by the screws SS - The upper ends of these screws turn in & bear against the boxes of the
axle of the wheels, or cylinder II. & the lower ends screw into nuts, in the boxes of the
cylinder M. The object & use of these screws, is to draw the two cylinders together when
their surfaces are worn away, by the operation of the machine & their diameters dimin-
ished. The straw, hay, or other substance, to be cut, passes between these cylinders, & in
its passage, is cut into pieces of the length of the distances between the knives. The knives
are taken out when they are to be ground.

The advantages of this machine, over machines made for the same purpose, are
the ease with which it is operated, the facility with which any quantity of hay, or
straw may be cut - the length of time, it may be used, without needing to be ground
or sharpened, the edges of the knives, never coming in contact with one another, but
only with a soft metal & the substance to be cut, but more than all, in the fact
that in case a stone or other hard substance, concealed in the substance to be cut,
is brought in contact with the knives it will injure only a small part of the machine
& the owner by inserting a new knife in place of the one injured is delayed in this
operation but a very short time, or he can continue his operation without that, the
effect of that injury being only to let the substance to be cut, pass the injured knife
without being severed - What I claim as new & as my own invention in the above
described machine & for the use of which I ask an exclusive privilege is the construction
of machine for cutting or chopping straw or hay for cattle & horses, having the knives

N. PETERS, PHOTO-LITHOGRAPHER, WASHINGTON, D.C.

7701X inserted in or fastened to the circumference of a cylinder revolving on its own axis,
the cutting edge of said knives coming in contact with the circumference of another
cylinder of lead or other soft metal, revolving on its own axis, cuts or severs the sub-
stance passing between them, the surfaces of these cylinders being held in contact by
side boxes & screws, & drawn together by the same means, when worn away by use.

Witnesses
Charles T. Searle
William R. Staples

Benjamin P. Greene

Exd
[illegible]

1173 [illegible]

Dr. in portfolio